(12) United States Patent
Morimoto

(10) Patent No.: US 6,226,257 B1
(45) Date of Patent: May 1, 2001

(54) OPTICAL INFORMATION STORAGE MEDIUM HAVING LANDS AND GROOVES BOTH SERVING AS RECORDING TRACKS

(75) Inventor: Yasuaki Morimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/409,945

(22) Filed: Sep. 30, 1999

(30) Foreign Application Priority Data

Mar. 17, 1999 (JP) .................................................. 11-071490

(51) Int. Cl.⁷ ...................................................... G11B 7/24
(52) U.S. Cl. ............................................ 369/275.4; 369/13
(58) Field of Search ........................... 369/275.4, 275.3, 369/275.1, 277, 278, 279, 275.2, 272, 13, 109.01, 110.01, 116, 111, 44.26, 44.29, 47.1

(56) References Cited

U.S. PATENT DOCUMENTS

| | | | |
|---|---|---|---|
| 5,383,176 | * | 1/1995 | Inui et al. ........................ 369/275.4 |
| 5,754,506 | * | 5/1998 | Nagasawa et al. ................ 369/44.26 |
| 5,805,565 | * | 9/1998 | Miyamoto et al. ............... 369/275.4 |
| 5,867,474 | * | 2/1999 | Nagasawa et al. ................ 369/275.3 |
| 5,898,663 | * | 4/1999 | Miyamoto et al. ............... 369/275.4 |

FOREIGN PATENT DOCUMENTS

| | | |
|---|---|---|
| 6028729 | 2/1994 | (JP) . |
| 6333240 | 12/1994 | (JP) . |
| 9724719 | 7/1997 | (JP) . |
| 9259439 | 10/1997 | (JP) . |
| 10079125 | 3/1998 | (JP) . |
| 10106040 | 4/1998 | (JP) . |

* cited by examiner

Primary Examiner—Ali Neyzari
(74) Attorney, Agent, or Firm—Greer, Burns & Crain, Ltd.

(57) ABSTRACT

An optical information recording medium having a plurality of grooves and a plurality of lands alternately formed, where each groove and each land function as recording tracks. The medium includes a first header region having a plurality of first phase pits respectively formed on extensions of the plurality of lands, and a second header region having a plurality of second phase pits respectively formed on extensions of the plurality of grooves. Each groove has an optical depth of about $3\lambda/8$, where $\lambda$ is the wavelength of a light beam to be used. Each first phase pit has an optical depth that is smaller than that of each groove. Each second phase pit has an optical depth that is substantially equal to that of each groove. The first header region and the second header region are shifted from each other along the extension of each groove.

8 Claims, 10 Drawing Sheets

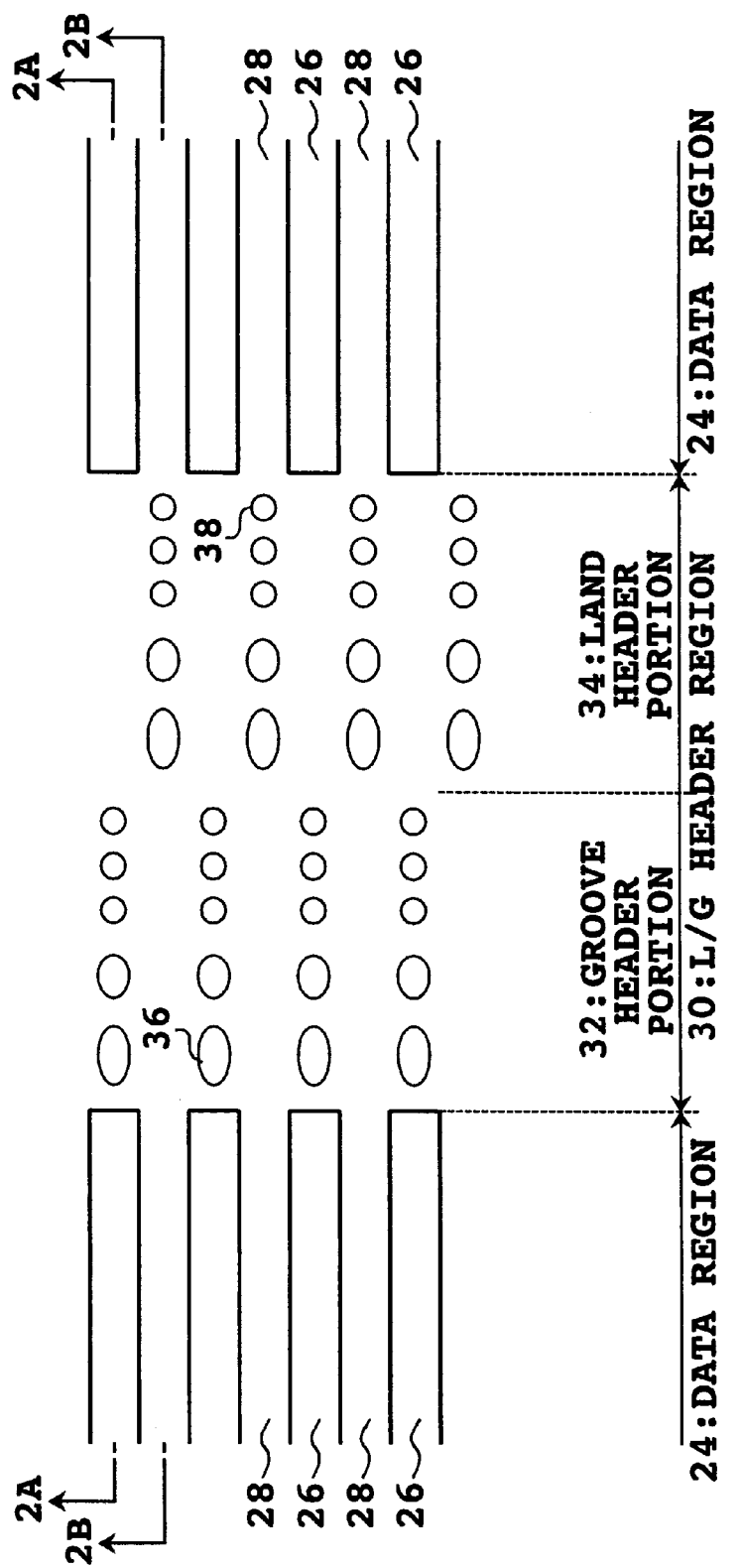

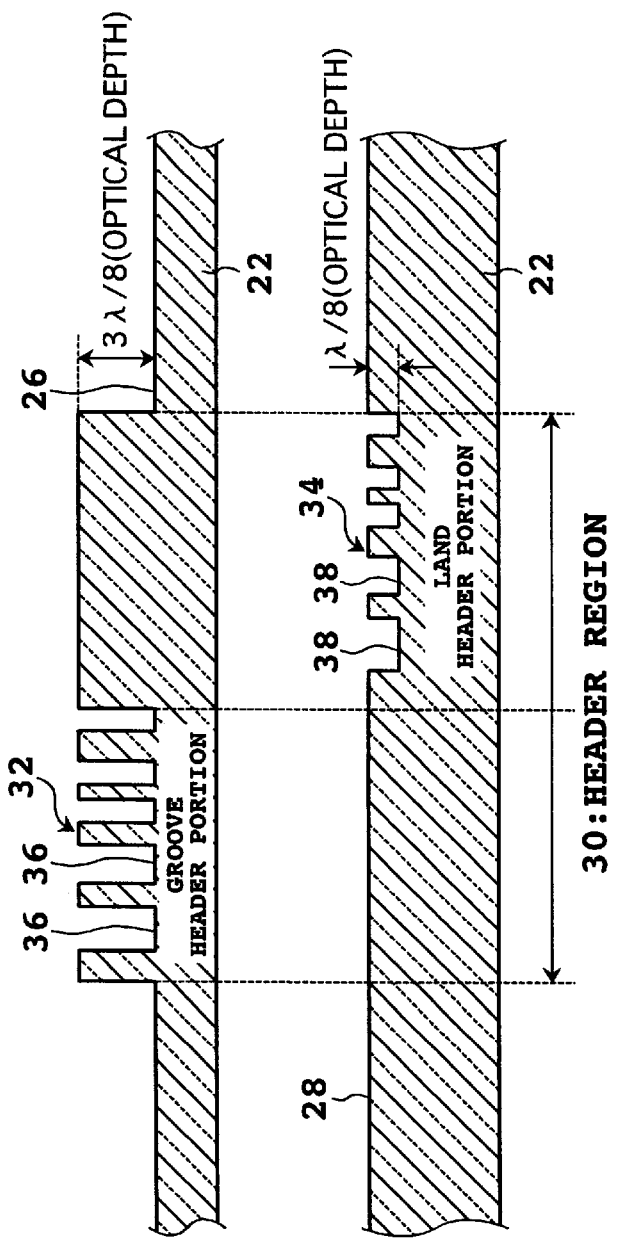

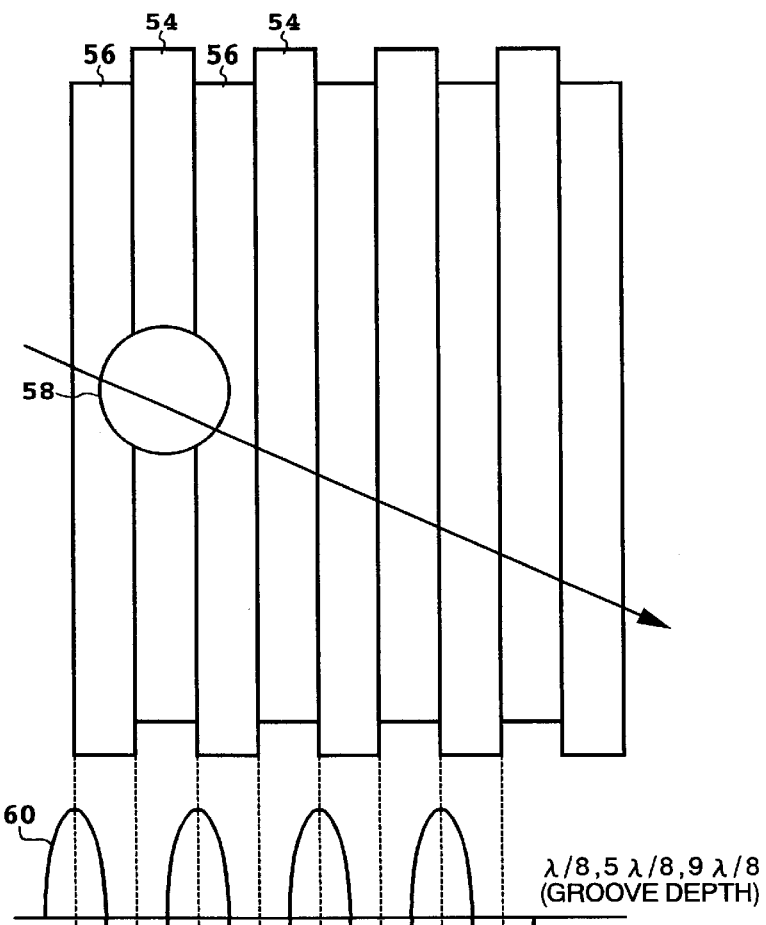
FIG.5A
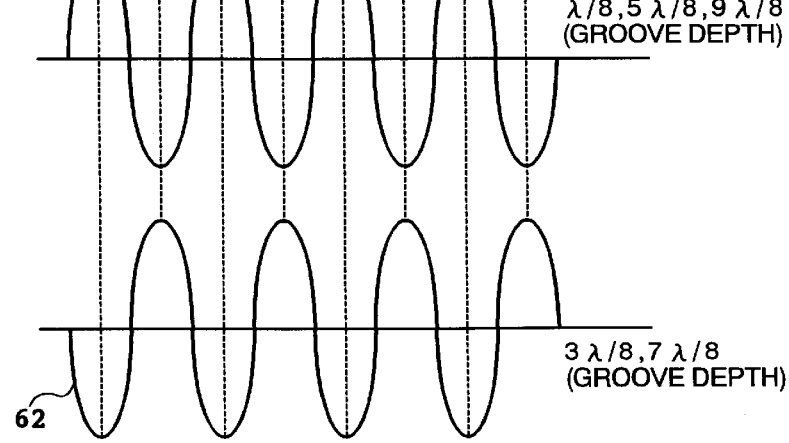
FIG.5B
FIG.5C $\lambda/8, 5\lambda/8, 9\lambda/8$
(PHASE PIT DEPTH)

$3\lambda/8, 7\lambda/8$
(PHASE PIT DEPTH)

OPTICAL INFORMATION STORAGE MEDIUM HAVING LANDS AND GROOVES BOTH SERVING AS RECORDING TRACKS

BACKGROUND OF THE INVENTION

1. Field of the Invention

The present invention relates generally to an optical information storage medium having lands and grooves both serving as recording tracks, and more particularly to an optical information storage medium which can obtain a stable push-pull signal during the scanning of a land/groove header region with a light beam.

2. Description of the Related Art

Optical disks are classified generally into read-only optical disks such as CD-ROMS, a write-once optical disks on which only writing is allowed, and rewritable optical disks such as magneto-optical disks and phase-change optical disks. Such optical disks have received attention as a memory medium that becomes a core in the recent rapid development of multimedia. A plurality of grooves are formed on a substrate of the optical disk in a concentric or spiral fashion to guide a laser beam to be directed onto the substrate. A flat portion defined between any adjacent of the grooves is called a land.

In a typical adjacent optical disk in the prior art, either the lands or the grooves are used as recording tracks on which information is recorded. Accordingly, a header portion composed of a plurality of phase pits preliminarily formed can be configured by a greatly simple method. However, a recent important technical subject to be considered is to increase recording density by using both the lands and the grooves as the recording tracks to thereby decrease the track pitch. In this respect, various methods for realizing this subject have already been proposed.

In a conventional optical disk adopting a land/groove recording method, the optical depth of each groove is set to about $\lambda/8$ ($\lambda$: operating wavelength) in general, and the optical depth of each phase pit in the header portion is also set to about $\lambda/8$ in general. The reason for this setting is that in a magneto-optical recording medium, for example, if the optical depth of each groove is set larger than $\lambda/8$, the reproduction signal becomes too small, whereas if the optical depth of each groove is set smaller than $\lambda/8$, the sufficient quality of header signal itself cannot be obtained.

More specifically, the header portion consists of a land header portion for the lands as recording tracks and a groove header portion for the grooves as recording tracks. The land header portion is formed on an extension of each land in a space defined by once interrupting each groove, and the groove header portion is formed on an extension of each groove in this space. Alternatively, the land and groove header portions are formed at a mirror portion on an extension of the boundary between each groove and its neighboring land. The land and groove header portions are shifted from each other in the circumferential direction of an optical disk.

As another conventional land/groove recording method, a continuous groove is formed on the substrate. The groove header portion is formed by modulating the width of each groove, and the land header portion is formed with general phase pits. Each phase pit and each groove have the same optical depth. Also in this conventional method, the land header portion and the groove header portion are not adjacent to each other in the radial direction of an optical disk. That is, the land and groove header portions are shifted from each other in the circumferential direction of an optical disk.

In the conventional land/groove recording, the grooves are formed in a data region on the substrate in a concentric or spiral fashion, and the flat land is defined between any adjacent ones of the grooves. Each groove is interrupted once at the header region. Accordingly, the groove header portion for each groove as a recording track and the land header portion for each land as a recording track are located as phase pits in the Land/Groove header region where each groove is interrupted once. The optical depth of each phase pit is set to about $\lambda/8$ ($\lambda$: operating wavelength), which is the same as the optical depth of each groove.

As a tracking error detecting method, a push-pull method and a heterodyne method, for example, are known. The push-pull method is a method utilizing the fact that the distribution of reflected light from an optical disk changes according to a positional relation between a beam spot of a laser beam focused on the optical disk by an objective lens and each groove formed on the optical disk, thereby effecting tracking error detection. When the center of the beam spot lies on the center line of each groove, the distribution of reflected light is uniform, whereas when the center of the beam spot is deviated from the center line of each groove, the distribution of reflected light become nonuniform, that is, it is shifted from the center line of each groove to the right or the left.

Accordingly, tracking error detection can be performed in the following manner. A reflected beam from an optical disk is made to enter a hologram diffraction grating for equally dividing the reflected beam into two beams along a line parallel to direction of information recording on the optical disk when the center of a beam spot directed on the optical disk lies on the center line of each groove. Then, the two beams obtained above are made to enter different photodetectors A and B. As a result, a tracking error signal TES can be expressed as follows:

$$TES = fa - fb$$

where fa and fb are the outputs from the photodetectors A and B, respectively.

Accordingly, tracking error detection can be performed according to a value of TES.

By setting the optical depth of each groove formed on the optical disk to $\lambda/8$ where $\lambda$ is the wavelength of a laser beam incident on the optical disk, the change in the distribution of reflected light due to variations in the focusing position of the laser beam is maximized. For this reason, the optical depth of each groove is set to $\lambda/8$ in the conventional method.

In the conventional method mentioned above, the optical depth of each phase pit formed as the groove header portion for each groove serving as a recording track is the same as the optical depth of each phase pit formed as the land header portion for each land serving as a recording track. Further, the optical depth of each groove is about $\lambda/8$, and the optical depth of each phase pit is $\lambda/8$ at the maximum.

A remarkably characteristic point in this structure is that as far as the optical depth of each groove formed on the substrate of the optical disk falls within $\lambda/4$, the polarity of a so-called push-pull signal (track error signal) is constant. Since each phase pit at the groove header portion and each phase pit at the land header portion have the same optical depth, the polarities of the push-pull signals with respect to both the phase pits are the same.

However, the groove header portion and the land header portion are radially shifted from each other by one track. Accordingly, when a laser beam spot scanning a certain groove track enters its Land/Groove header region, the beam spot successively scans the phase pits at the groove header portion. At this time, the polarity of a push-pull signal due to the phase pits at the groove header portion is the same as the polarity of a push-pull signal during scanning of the groove track, so that tracking servo is stably operated.

After passing the groove header portion, the beam spot scans a flat region interposed between two adjacent lines of the phase pits at the radially adjacent land header portions. Each phase pit of these land header portions defining the flat region therebetween has an optical depth of $\lambda/8$ equal to that of each groove. Accordingly, the polarity of a push-pull signal due to the phase pits at each land header portion is inverted from the polarity of a push-pull signal due to the phase pits at the groove header portion.

That is, there occurs a rapid inversion of the polarity of a push-pull signal at the boundary between the groove header portion and the successive land header portion, causing a problem in that the flat region between the adjacent land header portions cannot be scanned in this case. To solve this problem, it is necessary to provide any means for detecting a timing corresponding to the above boundary and electrically inverting the polarity of a push-pull signal at the land header portion. As a result, an optical disk drive in the prior art becomes complicated in configuration.

SUMMARY OF THE INVENTION

It is therefore an object of the present invention to provide a land/groove recording type optical information storage medium which can stably obtain both a track error signal and a push-pull signal as a header signal.

In accordance with an aspect of the present invention, there is provided an optical information storage medium having a plurality of grooves and a plurality of lands alternately formed, each of said grooves and each of said lands functioning as recording tracks to form an information storage region, said optical information storage medium comprising a first header region having a plurality of first phase pits respectively formed on extensions of said plurality of lands; and a second header region having a plurality of second phase pits respectively formed on extensions of said plurality of grooves; each of said grooves having an optical depth of approximately $3\lambda/8$ where $\lambda$ is the wavelength of a light beam to be used; each of said first phase pits having an optical depth smaller than that of each of said grooves; each of said second phase pits having an optical depth substantially equal to that of each of said grooves; said first header region and said second header region being shifted from each other along the extension of each of said grooves.

Preferably, the optical depth of each of said first phase pits is set so that the polarities of push-pull signals obtained by the light beam directed on said first and second phase pits and diffracted in a direction perpendicular to a direction of movement of said first and second phase pits are opposite to each other between said first and second phase pits, and that the polarity of a push-pull signal in said first header region is the same as the polarity of a push-pull signal generated by each land. For example, the effective optical depth of each first phase pit in the first header region is $\lambda/8$, and the optical depth of each second phase pit in the second header region is about $3\lambda/8$.

In accordance with another aspect of the present invention, there is provided an optical information storage medium having a plurality of grooves and a plurality of lands alternately formed, each of said grooves and each of said lands functioning as recording tracks to form an information storage region, said optical information storage medium comprising a first header region having a plurality of first phase pits respectively formed on extensions of said plurality of lands; and a second header region having a plurality of second phase pits respectively formed on extensions of said plurality of grooves; said first header region and said second header region being shifted from each other along an extension of each of said grooves; each of said grooves having an optical depth of $(2n+1)\lambda/8$ where $\lambda$ is the wavelength of a light beam to be used and n is a positive integer; each of said first phase pits having an optical depth of $(2n-1-4m)\lambda/8$ where m is an integer not less than 0; each of said second phase pits having an optical depth of $(2n+1-4s)\lambda/8$ where s is an integer not less than 0; said n, m, and s being related so as to satisfy conditions of $2n-1-4m>0$ and $2n+1-4s>0$.

In accordance with a further aspect of the present invention, there is provided an optical information storage medium having a plurality of first grooves and a plurality of lands alternately formed, each of said first grooves and each of said lands functioning as recording tracks to form an information storage region, said optical information storage medium comprising a plurality of second grooves respectively formed on extensions of said first grooves so as to continue to said first grooves, each of said second grooves having a width smaller than that of each of said first grooves; a groove header region having a plurality of first phase pits respectively formed so as to overlap said plurality of second grooves; and a land header region having a plurality of second phase pits respectively formed on extensions of said plurality of lands so that each of said second phase pits is interposed between any adjacent ones of said second grooves; said groove header region and said land header region being shifted from each other along the extension of each first groove; all of said first grooves, said second grooves, and said first phase pits having the same optical depth of about $(2n+1)\lambda/8$ where A is the wavelength of a light beam to be used and n is a positive integer; each of said second phase pits having an effective optical depth of about $(2m-1)\lambda/4$ where m is a positive integer; said n and m being related so as to satisfy a condition of $(2m-1)\lambda/4<(2n+1)\lambda/8$.

Preferably, a land/groove common sector mark region is formed independently of the groove header region and the land header region in succession to the first grooves. By forming such a sector mark region common for the first grooves and the lands, the total length of the groove header region and the land header region can be reduced to thereby allow an increase in recording capacity.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 1 is a schematic plan view showing a substrate format according to a first preferred embodiment of the present invention;

FIG. 2A is a cross section taken along the line 2A—2A in FIG. 1;

FIG. 2B is a cross section taken along the line 2B—2B in FIG. 1;

FIGS. 5A to 5C are illustrations of polarity inversion of a push-pull signal according to groove depths;

DETAILED DESCRIPTION OF THE PREFERRED EMBODIMENTS

Figure 3A:
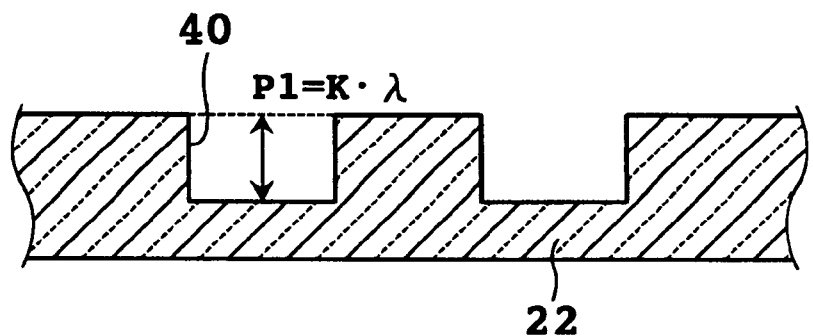
FIG. 3A is a sectional view illustrating the optical depth of a rectangular groove.

Some preferred embodiments of the present invention will now be described in detail with reference to the drawings. FIG. 1 is a schematic plan view of an optical information recording medium (optical disk) according to a first preferred embodiment of the present invention, showing the structure of a header region 30 interposed between data recording regions 24 of the medium. FIG. 2A is a cross section taken along the line 2A—2A in FIG. 1, and FIG. 2B is a cross section taken along the line 2B—2B in FIG. 1. For clarity of illustration, an information recording layer formed on a substrate 22 is not shown.

A plurality of grooves 26 are formed on the substrate 22 in a concentric or spiral fashion. A flat land 28 is defined between each set of adjacent grooves 26. Each groove 26 as a recording track is interrupted at the header region 30. In this preferred embodiment, both the grooves 26 and the lands 28 are used as recording tracks, so that the data recording regions 24 are defined along the recording tracks of the grooves 26 as well as along the lands 28.

The header region 30 includes a groove header portion 32 and a land header portion 34. Each of the header portions 32 and 34 is composed of a sector mark (SM), an address mark (AM), an and ID signal. The groove header portion 32 is formed with a plurality of lines of phase pits 36 respectively corresponding to the plurality of grooves 26. That is, the phase pits 36 in each line are arranged along the extension of the corresponding groove 26. Similarly, the land header portion 34 is formed with a plurality of lines of phase pits 38 respectively corresponding to the plurality of lands 28. That is, the phase pits 38 in each line are arranged along the extension of the corresponding land 28. The phase pits 36 in the groove header portion 32 and the phase pits 38 in the land header portion 34 are shifted from each other in the circumferential direction of the optical disk without neighboring each other in the radial direction of the optical disk.

Letting $\lambda$ denote the wavelength of a laser beam to be used, the effective optical depth of each groove 26 is set to about $3\lambda/8$, and the effective optical depth of each phase pit 36 in the groove header portion 32 also is set to about $3\lambda/8$. On the other hand, the effective optical depth of each phase pit 38 in the land header portion 34 for the lands 28 each serving as a recording track defined between adjacent grooves 26 is set to about $\lambda/8$.

The term of "optical depth" used in this specification means a depth determined without consideration of the refractive index n of a medium through which light is passed. Further, the reason for use of the expression of "effective optical depth" is such that the cross sections of the phase pits 36 and 38 are not rectangular, but trapezoidal or tapered in an actual optical disk, so that the optical depth of each phase pit is slightly greater at the deepest portion thereof. However, each phase pit behaves substantially similarly to a rectangular pit having an optical depth of $\lambda/8$, for example.

Figure 3B:
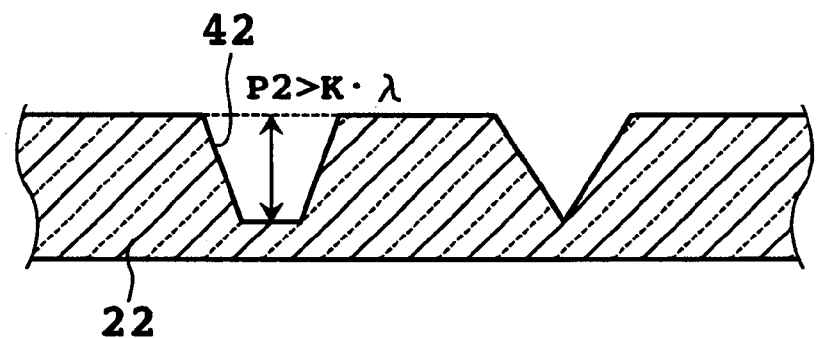
FIG. 3B is a sectional view illustrating the optical depth of a tapered groove.

This will now be described more specifically with reference to FIGS. 3A and 3B, which are cross sections taken in the radial directions of optical disks. That is, FIG. 3A illustrates a rectangular pit or groove 40 formed on a substrate 22, and FIG. 3B illustrates a tapered or trapezoidal pit or groove 42 formed on a substrate 22. In FIG. 3A, P1 denotes the optical depth of the rectangular pit or groove 40. In FIG. 3B, P2 denotes the optical depth of the deepest portion of the tapered pit or groove 42. Reference symbol K represents a coefficient such as $\frac{1}{8}$ and $\frac{3}{8}$. The tapered pit or groove 42 shown in FIG. 3B is an actual pit or groove formed on an optical disk, and the optical depth P2 of the deepest portion of the tapered pit or groove 42 is set slightly greater than the optical depth P1 of the rectangular pit or groove 40 shown in FIG. 3A, in order that the tapered pit or groove 42 behaves similarly to the rectangular pit or groove 40.

Figure 4:
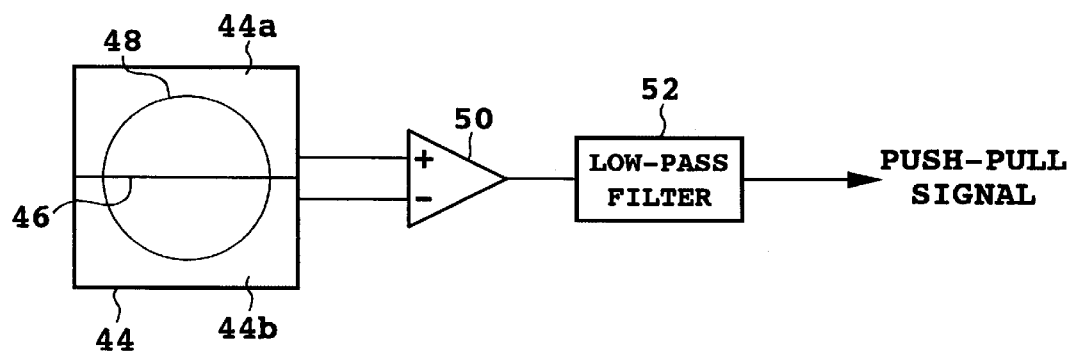
FIG. 4 is a diagram for illustrating a push-pull signal as a track error signal.

FIG. 4 is a diagram for illustrating tracking error detection by a push-pull signal. Reference numeral 44 denotes a two-segment photodetector divided into two segments 44a and 44b by a division line 46. Reference numeral 48 denotes a beam spot formed on the two-segment photodetector 44 by a light beam reflected from the optical information recording medium. Outputs from the segments 44a and 44b of the two-segment photodetector 44 are input into a differential amplifier 50, and an output from the differential amplifier 50 is passed through a low-pass filter 52 to output a push-pull signal as a difference between the outputs from the segments 44a and 44b.

When a laser beam scanning any one of the grooves 26 having an optical depth of $3\lambda/8$ comes to the groove header portion 32, the push-pull signal as a track error signal can be detected without inversion of the polarity of the push-pull signal in the same manner as during scanning the groove 26, because phase pits 36 each having an optical depth of $3\lambda/8$ are formed on the groove header portion 32. When the laser beam further comes to a flat portion of the land header portion 34 interposed between adjacent lines of the phase pits 38, the polarity of the push-pull signal is inverted from that in the case of the optical depth of $3\lambda/8$, because each phase pit 38 has an optical depth of $\lambda/8$.

The laser beam is intended to scan the flat portion (land) interposed between adjacent lines of the phase pits 38. Because of the polarity inversion of the push-pull signal mentioned above and the fact that the polarity of the push-pull signal during land scanning is inverse to the polarity of the push-pull signal during groove scanning, the push-pull signal (track error signal) having the same polarity as that during groove scanning can be obtained. Similarly, also when the laser beam scanning any one of the lands 28 comes to the header region 30, the header region 30 can be scanned without changing the polarity of the push-pull signal (track error signal).

Figure 6A:
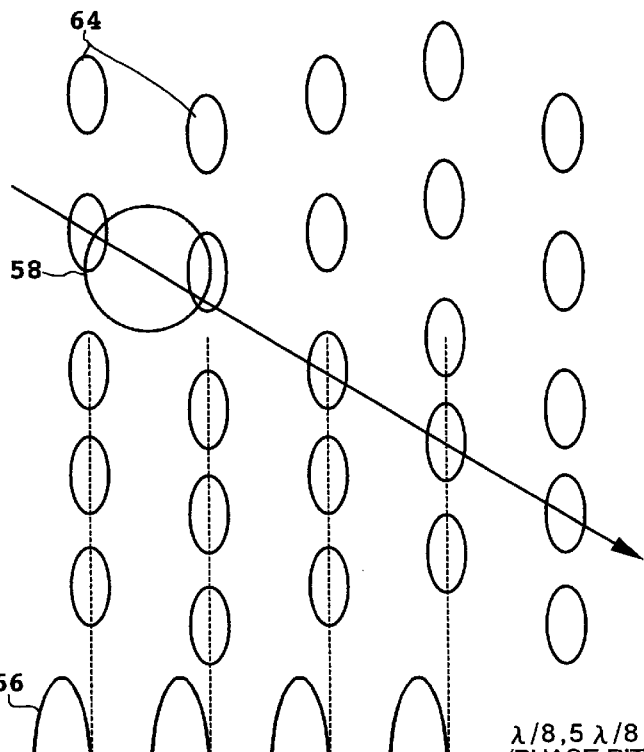
FIGS. 6A to 6C are illustrations of polarity inversion of a push-pull signal according to phase pit depths.

There will now be described the polarity inversion of the push-pull signal according to the groove depth and the pit depth with reference to FIGS. 5A to 6C. These figures are images obtained by assuming push-pull signals observed because of disk eccentricity in the case that track servo is not in an ON state. Referring to FIG. 5A, a plurality of grooves 54 and a plurality of lands 56 are alternately formed. Referring to FIG. 6A, a plurality of lines of phase pits 64 are formed. Both FIGS. 5A and 6A show a condition where a beam spot 58 relatively moves at an angle with respect to the tracks (as intersecting the tracks as viewed in plan).

FIG. 5B shows a push-pull signal 60 in the case that the optical depth of each groove 54 is $\lambda/8$, $5\lambda/8$, $9\lambda/8$, ..., and FIG. 5C shows a push-pull signal 62 in the case that the optical depth of each groove 54 is $3\lambda/8$, $7\lambda/8$, .... As apparent from FIGS. 5B and 5C, the phases of the push-pull signals 60 and 62 are shifted 180° from each other according to the optical depth of each groove 54, so that the polarities of the signals 60 and 62 are inverted from each other.

Figure 6B:
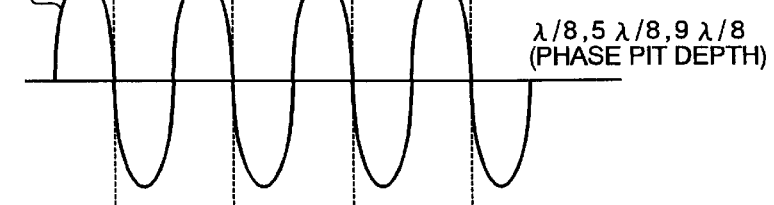
Figure 6C:
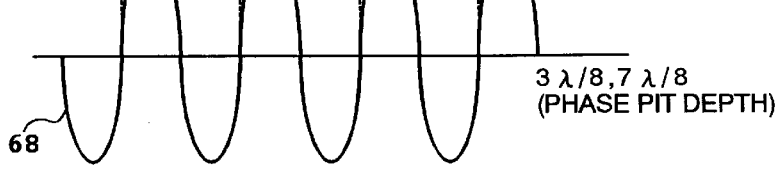

FIG. 6B shows a push-pull signal 66 in the case that the optical depth of each phase pit 64 is $\lambda/8$, $5\lambda/8$, $9\lambda/8$, ..., and FIG. 6C shows a push-pull signal 68 in the case that the optical depth of each phase pit 64 is $3\lambda/8$, $7\lambda/8$, .... As apparent from FIGS. 6B and 6C, the phases of the push-pull signals 66 and 68 are shifted 180° from each other according to the optical depth of each phase pit 64 as similarly to the case of each groove 54 mentioned above, so that the polarities of the signals 66 and 68 are inverted from each other.

As a development of the first preferred embodiment obtained by expanding the above concept, the optical depth of each groove 26 may be set to $(2n+1)\lambda/8$ (n is a positive integer), the optical depth of each phase pit 38 formed on the land header portion 34 may be set to $(2n-1-4m)\lambda/8$ (m is an integer not less than 0), and the optical depth of each phase pit 36 formed on the groove header portion 32 may be set to $(2n+1-4s)\lambda/8$ (s is an integer not less than 0). In this case, the relations of $2n-1-4m>0$ and $2n+1-4s>0$ must be satisfied. In the optical information recording medium including the grooves 26 and the phase pits 36 and 38 having specific optical depths according to all combinations satisfying the above conditions related to n, m, and s, a stable push-pull signal can be obtained without electrically inverting the polarity of the push-pull signal.

Accordingly, there is a possible combination such that the optical depths of each groove 26, each phase pit 36, and each phase pit 38 may be different from each other. For example, also in the case that the optical depth of each groove 26 is $5\lambda/8$, that the optical depth of each phase pit 36 on the groove header portion 32 is $\lambda/8$, and that the optical depth of each phase pit 38 on the land header portion 34 is $3\lambda/8$, an effect similar to that of the first preferred embodiment can be exhibited.

Figure 7:
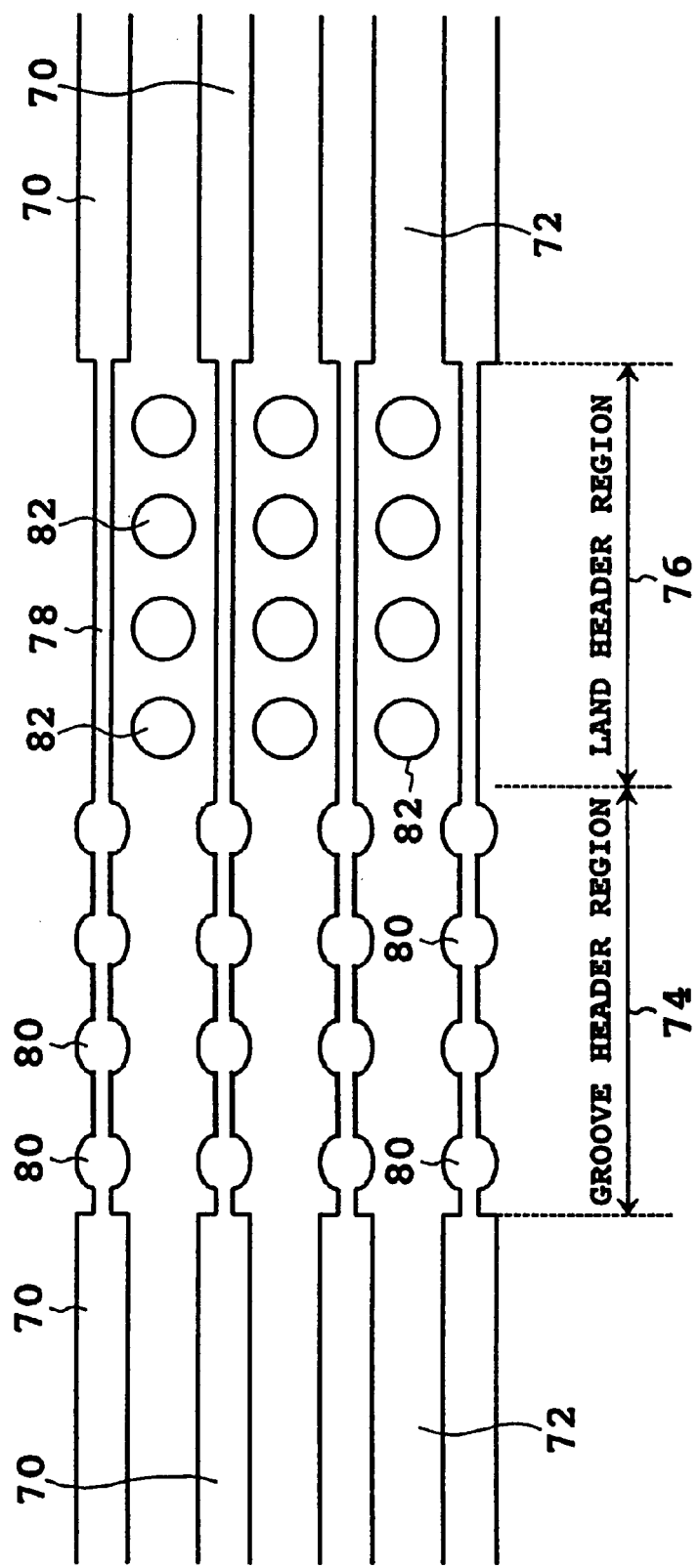
FIG. 7 is a schematic plan view showing a substrate format in a comparison.

FIG. 7 is a plan view similar to FIG. 1, showing a comparison similar to the configuration of a header portion of a land/groove recording medium disclosed in Japanese Patent Laid-open No. 10-79125, for example. A plurality of grooves 70 are formed on a substrate in a concentric or spiral fashion, and a flat land 72 is defined between any adjacent ones of the grooves 70. A groove header region 74 and a land header region 76 are defined between opposite data regions where the grooves 70 and the land 72 are formed. A plurality of grooves 78 are formed in the groove header region 74 and the land header region 76 so as to respectively correspond to the plurality of grooves 70. That is, each groove 78 is formed along the extension of the corresponding groove 70. Each groove 78 has a width that is smaller than that of each groove 70. The groove header region 74 is further formed with a plurality of lines of phase pits 80 respectively corresponding to the plurality of grooves 78 in such a manner that the phase pits 80 in each line overlap the corresponding groove 78.

The land header region 76 is further formed with a plurality of lines of phase pits 82 respectively corresponding to the plurality of lands 72 as recording tracks. That is, the phase pits 82 in each line are arranged along the extension of the corresponding land 72 so as to be radially interposed between any adjacent ones of the grooves 78. In the configuration shown in FIG. 7, all of the grooves 70 and 78 and the phase pits 80 and 82 have the same optical depth. Although these grooves and phase pits may have different optical depths as described in Japanese Patent Laid-open No. 10-79125 cited above, no mention is made of the relation between the optical depth and the wavelength $\lambda$ of a laser beam to be used.

In the case that the optical depths of all of the grooves 70 and 78 and the phase pits 80 and 82 are set to $\lambda/8$ giving a maximum push-pull signal as a track error signal, a sufficient modulation degree of reflection from each phase pit 82 in the land header region 76 cannot be obtained because of the presence of the adjacent grooves 78 on the opposite sides. Further, a push-pull signal having a sufficient intensity cannot be obtained in the land header region 76 because of interference between a push-pull signal due to each groove 78 and a push-pull signal due to each phase pit 82.

Figure 8:
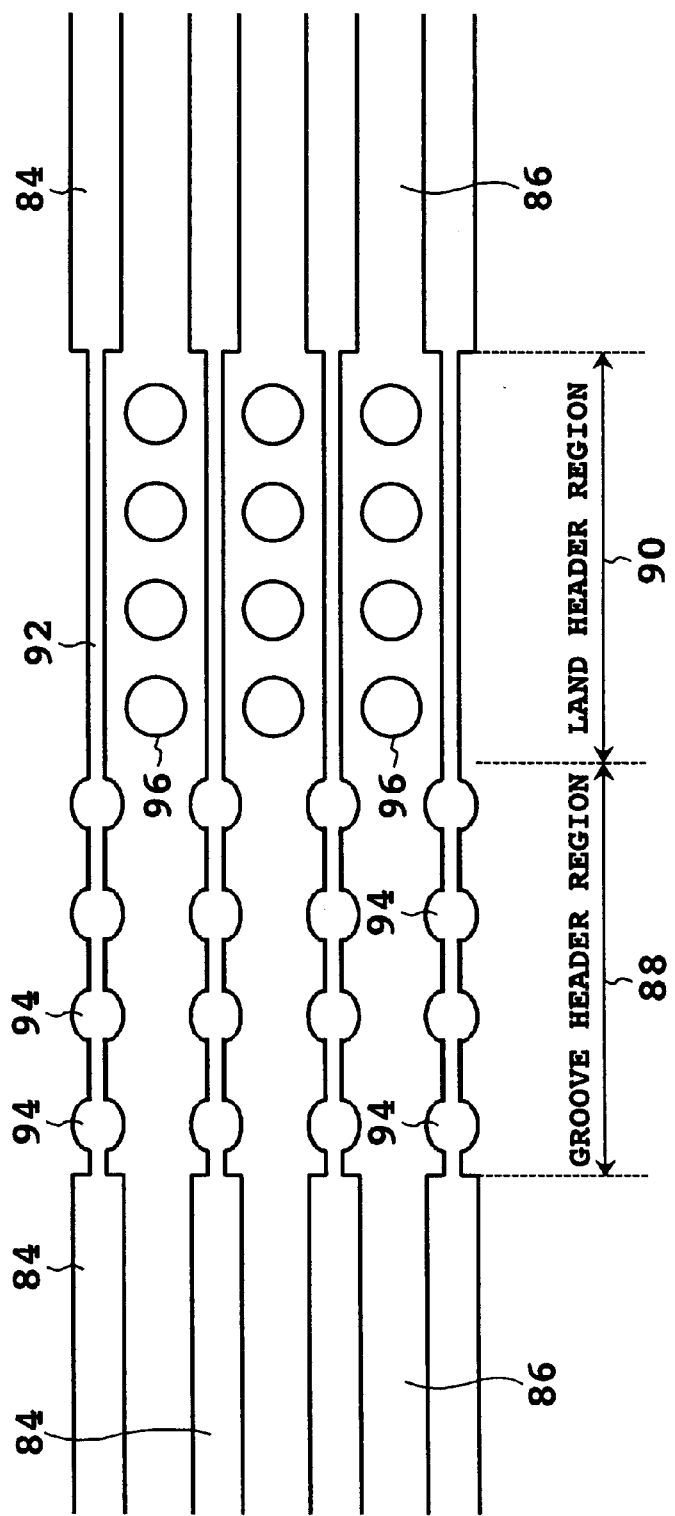
FIG. 8 is a schematic plan view showing a substrate format according to a second preferred embodiment of the present invention.

FIG. 8 is a schematic plan view showing the configuration of a header region according to a second preferred embodiment of the present invention, solving the above problems of the comparison shown in FIG. 7.

Like the configuration shown in FIG. 7, a plurality of grooves 84 are formed on a substrate in a concentric or spiral fashion, and a flat land 86 is defined between any adjacent ones of the grooves 84. A groove header region 88 and a land header region 90 are defined between opposite data regions where the grooves 84 and the lands 86 are formed. A plurality of grooves 92 are formed in the groove header region 88 and the land header region 90 so as to respectively correspond to the plurality of grooves 84. That is, each groove 92 is formed along the extension of the corresponding groove 84. Each groove 92 has a width smaller than that of each groove 84. The groove header region 88 is further formed with a plurality of lines of phase pits 94 respectively corresponding to the plurality of grooves 92 in such a manner that the phase pits 94 in each line overlap the corresponding groove 92. The land header region 90 is further formed with a plurality of lines of phase pits 96 respectively corresponding to the plurality of lands 86. That is, the phase pits 96 in each line are arranged along the extension of the corresponding land 86 so as to be radially interposed between any adjacent ones of the grooves 92.

In this preferred embodiment, the optical depths of all of the grooves 84, the grooves 92, and the phase pits 94 are set to $3\lambda/8$, and the optical depths of the phase pits 96 are set to $\lambda/4$. By setting the optical depths as mentioned above, the modulation degree of reflection from each phase pit 96 in the land header region 90 can be greatly improved. Further, the push-pull signal in the land header region 90 can also be greatly improved. The reason is that since the optical depth of each phase pit 96 is $\lambda/4$, a push-pull signal due to each phase pit 96 is not generated. Accordingly, a push-pull signal due to each groove 92 only is detected, so that stable tracking servo can be realized.

As a development of the second preferred embodiment obtained by expanding the above concept, the optical depths of all of the grooves 84, the grooves 92, and the phase pits 94 may be set to $(2n+1)\lambda/8$ (n is a positive integer), and the effective optical depth of each phase pit 96 formed in the land header region 90 may be set to $(2m-1)\lambda/4$ (m is a positive integer). In this case, however, the relation of $(2m-1)\lambda/4 < (2n+1)\lambda/8$ must be satisfied.

Figure 9:
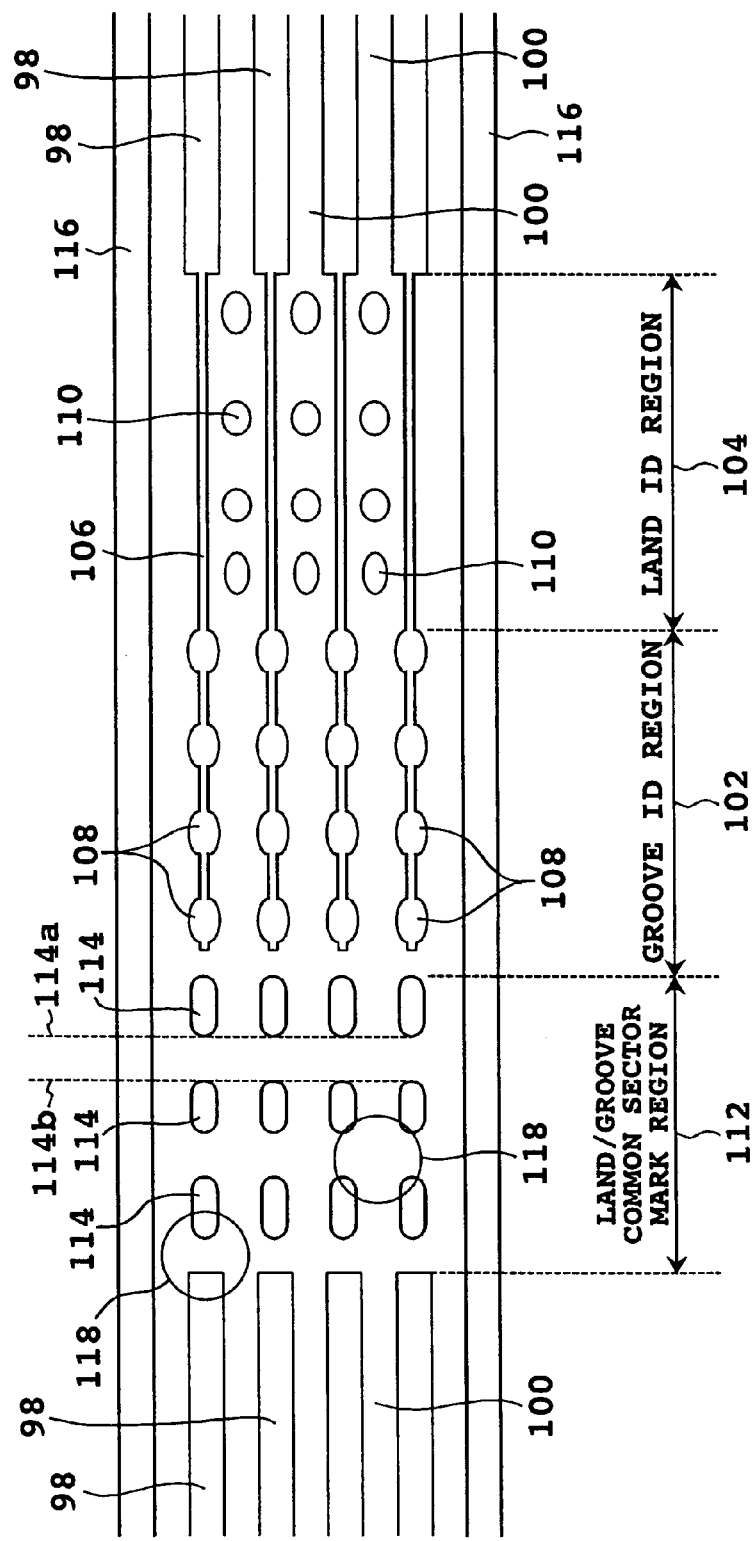
FIG. 9 is a schematic plan view showing a substrate format according to a third preferred embodiment of the present invention.

FIG. 9 is a schematic plan view showing the configuration of a header region according to a third preferred embodiment of the present invention. In a general optical information recording medium, sector marks (SM) are individually located in land and groove header regions. To the contrary, this preferred embodiment employs a substrate format in the case of detecting a common sector mark for a land and a groove. A plurality of grooves 98 are formed on a substrate in a concentric or spiral fashion, and a flat land 100 is defined between adjacent grooves 98. A groove ID region 102 and a land ID region 104 are defined between opposite data regions where the grooves 98 and the lands 100 are formed. A plurality of grooves 106 are formed in the groove ID region 102 and the land ID region 104 so as to respectively correspond to the plurality of grooves 98. That is, each groove 106 is formed along the extension of the corresponding groove 98. Each groove 106 has a width that is smaller than that of each groove 98.

The groove ID region 102 is further formed with a plurality of lines of phase pits 108 respectively corresponding to the plurality of grooves 106 in such a manner that the phase pits 108 in each line overlap the corresponding groove 106. Further, the land ID region 104 is further formed with a plurality of lines of phase pits 110 respectively corresponding to the plurality of lands 100. That is, the phase pits 110 in each line are arranged along the extension of the corresponding land 100 so as to be radially interposed between any adjacent ones of the grooves 106. In the groove ID region 102, the phase pits 108 are formed as an ID signal and an address mark (AM). Similarly, in the land ID region 104, the phase pits 110 are formed as an ID signal and an address mark (AM). A common sector mark region 112 is formed upstream of the groove ID region 102 so as to be circumferentially interposed between the upstream grooves 98 and the groove ID region 102. The common sector mark region 112 is formed as a plurality of lines of phase pits 114 respectively corresponding to the plurality of grooves 98. That is, the phase pits 114 in each line are arranged along the extension of the corresponding groove 98.

In scanning a certain one of the grooves 98 with a beam spot 118, the phase pit 114 irradiated with the beam spot 118 serves as a sector mark for a groove track. On the other hand, in detecting a sector mark for the land 100 as a recording track, the phase pits 114 covered with the beam spot 118 are detected as crosstalk as apparent from FIG. 9. In reproducing a land track, the phase pits 114 as a sector mark must be read as crosstalk. Accordingly, it is required that front edges 114a of the phase pits 114 adjacent to each other in the radial direction of the optical recording medium be radially aligned and that rear edges 114b of the radially adjacent phase pits 114 be also radially aligned.

In a zone constant angular velocity medium (ZCAV medium), the front edges 114a must be radially aligned in a zone and the rear edges 114b must be also radially aligned in this zone. To distinguish a certain zone from its adjacent zones, each zone is generally interposed between a pair of buffer tracks 116. As mentioned above, the sector marks for groove tracks and land tracks are formed as a common sector mark, thereby allowing a reduction in total length of the header region. As a result, the area of a data recording region can be increased to thereby allow an increase in recording capacity.

Figure 10:
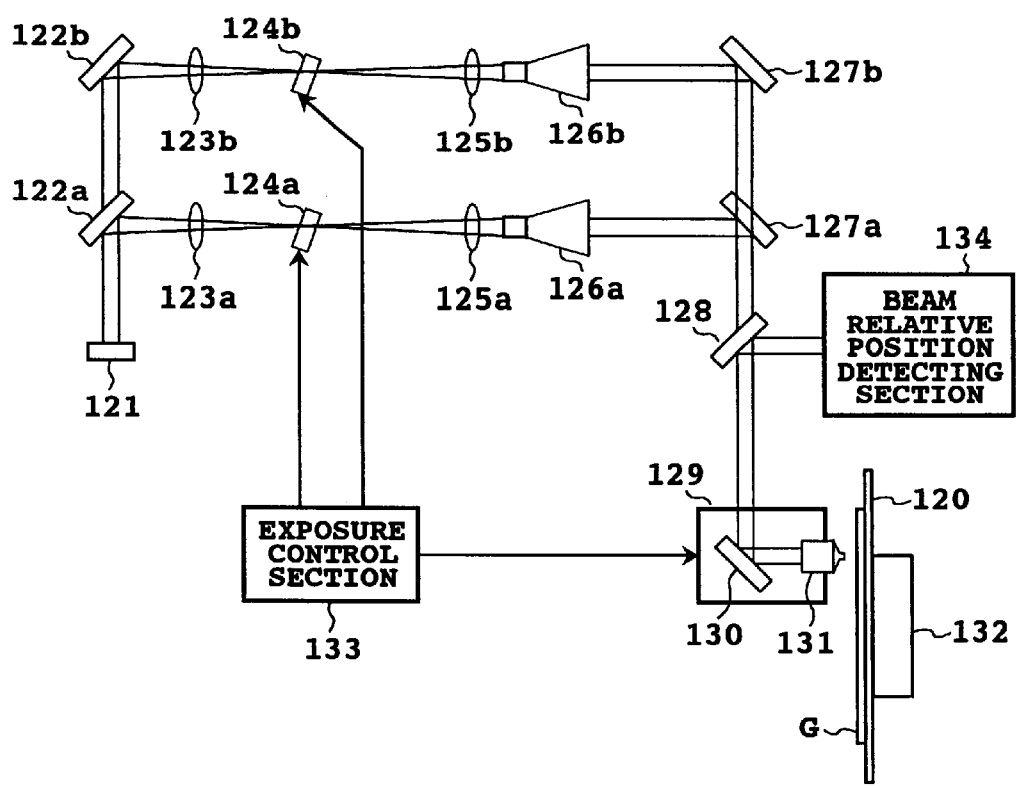
FIG. 10 is a schematic diagram showing the configuration of an apparatus for manufacturing the optical information recording medium according to the present invention.

A manufacturing method for the optical information recording medium according to the present invention as mentioned above will now be described. The substrate of the optical information recording medium can be obtained by first preparing a stamper from a glass master formed with grooves and prepits (phase pits) and next performing injection molding by use of the stamper. FIG. 10 is a schematic block diagram illustrating the configuration of a beam exposure apparatus used for manufacture of the optical information recording medium according to the present invention.

A photoresist having a thickness of 80 nm is formed on a polished glass master G by spin coating. The glass master G is next subjected to prebaking in a clean oven at 90° for 30 minutes. The glass master G is next placed on a table 120 of a spindle motor 132 in the beam exposure apparatus. In the beam exposure apparatus, a light beam emitted from an Ar laser source 121 is split into reflected light as a first light beam and transmitted light as a second light beam by a semitransparent mirror 122a. The first light beam reflected by the semitransparent mirror 122a enters a first condenser lens 123a. The light condensed by the first condenser lens 123a enters a first AOM (Acousto-Optic Modulator) 124a for modulation of light intensity.

The intensity-modulated light enters a first collimator lens 125a to restore a parallel light beam, which next enters a first beam expander 126a to expand the beam diameter of the parallel light beam. The parallel light beam is next reflected by a semitransparent mirror 127a to enter a semitransparent mirror 128. The first collimator lens 125a and a second collimator lens 125b, which will be hereinafter described, are movable in a direction perpendicular to their optical axes, thereby allowing control of the relative position between the first light beam and the second light beam.

The second light beam transmitted by the semitransparent mirror 122a enters a mirror 122b to travel a path similar to that of the first light beam. That is, the reflected light from the mirror 122b enters a second condenser lens 123b, and the resultant condensed light enters a second AOM 124b for modulation of light intensity. The intensity-modulated light output from the second AOM 124b enters a second collimator lens 125b to restore a parallel light beam, which next enters a second beam expander 126b to expand the beam diameter. The parallel light beam from the second beam expander 126b is reflected by a mirror 127b and next transmitted by the semitransparent mirror 127a to enter the semitransparent mirror 128.

The first and second light beams transmitted by the semitransparent mirror 128 enter an optical head 129 in the condition where the relative position controlled by the first and second collimator lenses 125a and 125b is maintained. The optical head 129 includes a dichroic mirror 130 and an objective lens 131, and is movable in two directions perpendicular and parallel to the table 120. The first and second light beams are reflected by the dichroic mirror 130, and are focused on the glass master G by the objective lens 131.

Focusing onto the glass master G is controlled by moving the optical head 129 in the direction perpendicular to the table 120. Such focusing control is performed by irradiating the glass master G with a laser beam having a wavelength of 780 nm (without sensitizing the photoresist formed on the glass master G) and by moving the optical head 129 in the direction perpendicular to the table 120 according to a focusing error signal based on the reflected light from the glass master G. Further, an irradiation position on the glass master G to be irradiated with the first and second light beams is controlled by moving the optical head 129 in the direction parallel to the table 120. Such parallel movement of the optical head 129 is performed by an instruction from an exposure control section 133.

The exposure control section 133 further gives instructions on exposure power to the first and second AOMs 124a and 124b to thereby control the degree of modulation of the light intensity. By this control, the optical depths of the grooves and the prepits to be formed on the glass master G are controlled. The first and second light beams focused on the glass master G and reflected therefrom are reflected by the dichroic mirror 130 and are next reflected by the semi-transparent mirror 128 to enter a beam relative position detecting section 134, in which the relative position between the first and second light beams can be monitored.

An example of the glass master G prepared by using the above beam exposure apparatus has specific dimensions such that the pitch of grooves G1 is 1.4 μm, the depth of each groove G1 is 80 nm, the circumferential length of each prepit P1 for clock generation in a preformat portion is 0.64 μm, the circumferential length of a space between the prepits P1 is 0.64 μm, the circumferential length of each prepit P11 for information recording in the preformat portion is 2.56 μm, and the circumferential length of a space between the prepits P11 is 2.56 μm. As a miscount prevention groove G11 further formed on the glass master G, various grooves having different depths, widths, and shapes, such as V grooves having depths of 30, 60, and 80 nm and U grooves having widths of 50, 100, and 150 nm at half depths, may be obtained.

It should be noted that the above beam exposure apparatus used to prepare the glass master G is merely illustrative, and the present invention is not limited to the above preferred embodiment. For example, a visible short-wave laser or an ultraviolet laser may be used to emit the light beam. Further, an EOM (Electro-Optic Modulator) may be used to modulate the intensity of the light beam. Further, any other apparatus capable of forming the grooves and prepits on the glass master G for controlling the intensity of the light beam may be adopted.

The glass master G formed with the grooves and the prepits is put into a vacuum evaporator to deposit an Ni film having a thickness of 0.2 μm on the surface of the glass master G, thereby forming electrodes for plating. Then, an Ni film having a thickness of 0.3 mm is formed by electroplating on the glass master G. Thereafter, the Ni film thus formed by electroplating is separated from the glass master G to obtain a stamper formed of Ni. By using this stamper, injection molding is performed to obtain a polycarbonate substrate. Accordingly, the substrate is formed with grooves and prepits identical in size with those of the glass master G.

Thereafter, a recording film is formed on the substrate in the following manner. First, a base layer of SiN having a thickness of 70 nm is formed on the substrate by RF magnetron sputtering. Secondly, a reproducing layer of $Gd_{22}(Fe_{70}Co_{30})_{78}$ having a thickness of 8 nm is formed on the base layer by sputtering. Thirdly, a recording layer of $Tb_{20}(Fe_{90}Co_{10})_{80}$ having a thickness of 17 nm is formed on the reproducing layer by sputtering. Fourthly, a top layer of SiN having a thickness of 15 nm is formed on the recording layer by sputtering. Finally, a reflecting layer of Al having a thickness of 100 nm is formed on the top layer by sputtering. Thereafter, a rewritable signal is recorded at an optical recording portion of grooves G1 and lands L1 on the recording film. That is, a cyclic pattern of recording marks each having a circumferential length of 0.64 μm is recorded at the optical recording portion, thus obtaining the optical information recording medium according to the present invention.

According to the present invention as described above, a push-pull signal as a track error signal in a land/groove recording type optical information recording medium can be stably obtained. Further, in scanning the groove track or the land track with a laser beam and successively scanning the header region from its groove header portion to the land header portion, it is unnecessary to electrically invert the polarity of a push-pull signal at the boundary between the groove header portion and the land header portion, thereby simplifying the configuration of a recording/reproducing apparatus.

Further, the sector mark, address mark, and ID signal in each of the lands and the grooves can be stably detected, thereby easily realizing the support to decreasing of a track pitch. Further, the optical depth of each groove is basically set to at least $3\lambda/8$ greater than $\lambda/8$ adopted in the prior art. Accordingly, in recording, erasing, or overwriting on each of the land tracks and the groove tracks, an effect of decreasing cross-writing or cross-erasing can be greatly improved, thereby supplying an optical information recording medium that can eliminate a possibility of data corruption.

What is claimed is:

1. An optical information storage medium having a plurality of grooves and a plurality of lands alternately formed, each of said grooves and each of said lands functioning as recording tracks to form an information storage region, said optical information storage medium comprising:

a first header region having a plurality of first phase pits respectively formed along imaginary lines extended from said plurality of lands; and a second header region having a plurality of second phase pits respectively formed along imaginary lines extended from said plurality of grooves;

wherein each of said grooves has an optical depth of approximately $3\lambda/8$ where $\lambda$ is the wavelength of a light beams to be used;

each of said first phase pits has an effective optical depth of approximately $\lambda/8$;

each of said second phase pits has an optical depth substantially equal to that of each of said grooves; and said first header region and said second header region are shifted from each other along the imaginary extension lines of each of said grooves.

2. An optical information storage medium having a plurality of grooves and a plurality of lands alternately formed each of said grooves and each of said lands functioning as recording tracks to form an information storage region, said optical information storage medium comprising:

a first header region having a plurality of first phase pits respectively formed on imaginary lines extended from said plurality of lands; and a second header region having a plurality of second phase pits respectively formed on imaginary lines extended from said plurality of grooves;

wherein each of said grooves has an optical depth of about $3\lambda/8$ where $\lambda$ is the wavelength of a light beam to be used;

each of said first phase pits has an optical depth smaller than that of each of said grooves;

each of said second phase pits has an optical depth substantially equal to that of each of said grooves; and said first header region and said second header region are shifted from each other along the imaginary extension lines of each of said grooves, and further wherein the optical depth of each of said first phase pits is set so that the polarities of push-pull signals obtained by the light beam directed on said first and second phase pits and diffracted in a direction perpendicular to a direction of movement of said first and second phase pits are opposite to each other between said first and second phase pits, and that the polarity of a push-pull signal in said first head region is the same as the polarity of a push-pull signal generated by each land.

3. An optical information storage medium having a plurality of grooves and a plurality of lands alternately formed, each of said grooves and each of said lands functioning as recording tracks to form an information storage region, said optical information storage medium comprising:

a first header region having a plurality of first phase pits respectively formed along imaginary lines extended from said plurality of lands; and a second header region having a plurality of second phase pits respectively formed along imaginary lines extended from said plurality of grooves;

wherein said first header region and said second header region are shifted from each other along the imaginary extension line of each of said grooves;

each of said grooves has an optical depth of $(2n+1)\lambda/8$ where $\lambda$ is the wavelength of a light beam to be used and n is a positive integer;

each of said first phase pits has an optical depth of $(2n-1-4m)\lambda/8$ where m is an integer not less than 0;

each of said second phase pits has an optical depth of $(2n+1-4s)\lambda/8$ where s is an integer not less than 0; and said n, said m, and said s are related so as to satisfy conditions of $2n-1-4m>0$ and $2n+1-4s>0$.

4. An optical information storage medium according to claim 3, wherein the optical depth of each of said second phase pits is smaller than that of each of said grooves.

5. An optical information storage medium having a plurality of first grooves and a plurality of lands alternately formed, each of said first grooves and each of said lands functioning as recording tracks to form an information storage region, said optical information storage medium comprising:

a plurality of second grooves respectively formed on extensions of said first grooves so as to continue to said first grooves, each of said second grooves having a width smaller than that of each of said first grooves;

a groove header region having a plurality of first phase pits respectively formed so as to overlap said plurality of second grooves; and a land header region having a plurality of second phase pits respectively formed along imaginary lines extended from said plurality of lands so that each of said second phase pits is interposed between any adjacent ones of said second grooves;

wherein said groove header region and said land header region are shifted from each other along the extension of each first groove;

all of said first grooves, said second grooves, and said first phase pits have the same optical depth of about $(2n+1)\lambda/8$ where $\lambda$ is the wavelength of a light beam to be used and n is a positive integer;

each of said second phase pits has an effective optical depth of about $(2m-1)\lambda/4$ where m is a positive integer; and said n and said m are related so as to satisfy a condition of $(2m-1)\lambda/4<(2n+1)\lambda/8$.

6. An optical information storage medium according to claim 5, wherein:

the optical depths of all of said first grooves, said second grooves, and said first phase pits are set to approximately $3\lambda/8$; and the optical depth of each of said second phase pits is set to approximately $\lambda/4$.

7. An optical information storage medium according to claim 5, further comprising a common sector mark region having a plurality of sector marks as third phase pits respectively corresponding to said plurality of first grooves, each of said third phase pits having an optical depth substantially equal to that of each of said first grooves and a width substantially equal to that of each of said first grooves.

8. An optical information storage medium according to claim 7, wherein said sector marks have front edges and rear edges both aligned in a direction perpendicular to an extension of each of said first grooves.

* * * * *